J. F. HEALY.
ATTACHMENT FOR TROLLEY POLES.
APPLICATION FILED JUNE 20, 1921.
1,409,376. Patented Mar. 14, 1922.
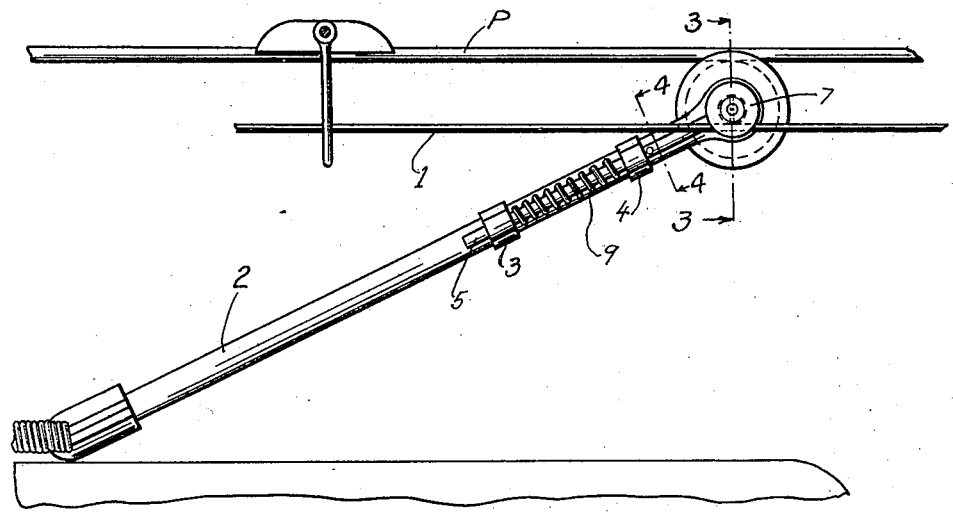
Fig. 1
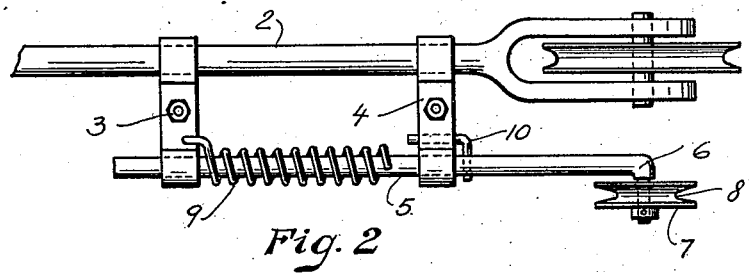
Fig. 2
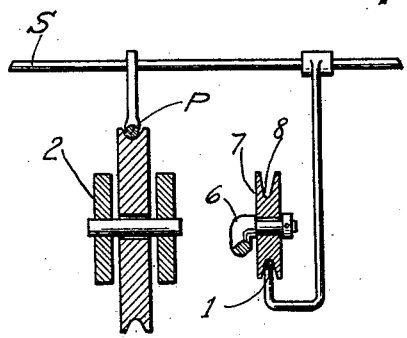
Fig. 3
Fig. 4
Witnesses:
Inventor
James F. Healy
By Joshua H. Potts
His Attorney

UNITED STATES PATENT OFFICE.

JAMES F. HEALY, OF CHICAGO, ILLINOIS.

ATTACHMENT FOR TROLLEY POLES.

1,409,376. Specification of Letters Patent. Patented Mar. 14, 1922.

Application filed June 20, 1921. Serial No. 479,032.

*To all whom it may concern:*

Be it known that I, JAMES F. HEALY, a citizen of the United States, and a resident of the city of Chicago, county of Cook, and State of Illinois, have invented certain new and useful Improvements in Attachments for Trolley Poles, of which the following is a specification.

This invention relates to attachments for trolley poles which are usually provided on electric railway cars for transmitting power thereto from a power cable, and has for its object the provision of a device which will effectively prevent accidental disengagement of a trolley pole from such power cable.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevation of the invention in operative position.

Fig. 2 is a top plan view of the invention.

Fig. 3 is a sectional view on the line 3—3, Fig. 1.

Fig. 4 is a sectional view on the line 4—4, Fig. 1.

My invention broadly consists of brackets mounted near the upper end of a trolley pole, which brackets carry a pulley adapted to resiliently engage a wire installed beside the usual power cable.

It is well known that in use trolley poles frequently become disengaged from the power cable, and especially is this likely to occur when the car is passing beneath viaducts, or travelling at high speed over uneven road beds, and when so disengaged such trolley poles are damaged or destroyed by striking against the viaduct or the cable supporting arms.

I have provided a practical and efficient device adapted to be attached to such trolley poles, which will effectually prevent disengagement of same from the power cable when a car is in motion, and which at the same time is so constructed that a violent and sudden pull will disengage the device thereby preventing a dislodgment of the power cable.

In the drawings I have shown a preferred embodiment of my invention, but of course modifications thereof may be made without departing from the scope of my invention. In ordinary use a power cable P supplies power to electric railway cars and is usually suspended from transverse supporting wires S by suitable hangers such as shown in the drawings. In carrying out my invention I preferably install a cable 1, of any suitable strength and thickness, adjacent to, and extending parallel with, the power wire P. The cable 1 may also be suspended from the wires used to support the power cable P.

The trolley pole 2 is preferably provided with spaced brackets 3 and 4 of any desirable type which are rigidly secured thereto, and may be insulated therefrom in any suitable manner. In the ends of brackets 3 and 4 is journaled a shaft 5, the outer end of which may be bent as shown at 6 to provide a bearing for a pulley 7 which is rotatably mounted thereon. The axis of the pulley 7 is preferably in the same plane as the axis of the trolley pole, but such pulley may be mounted in different positions if desired. The pulley 7 preferably has a deep peripheral groove 8 which is adapted to positively engage the cable 1 at all times.

Disposed about the shaft 5 is a spring 9, one end of which is attached to the bracket 3, and the other end of which is secured to the shaft 5, the spring 9 normally tending to rotate the shaft 5 and pulley 7 in a clockwise direction so as to resiliently engage the pulley 7 with the cable 1. Rotation of the shaft 5 is limited by a stop 10.

If desired the brackets 3 and 4 may be of such type as to support the shaft 5 at an angle to the trolley pole to permit of more effective operation of the device.

In operation the pulley 7 mounted on the upper end of the trolley pole is normally held in operative position by the tension of the spring 5. When the pulley engages the cable 1 it is retained in such engagement by the spring on the shaft, thereby holding the trolley pole resiliently against the power cable. If the trolley pole is violently pulled downwardly for any reason the pulley 7 turns inwardly thereby becoming disengaged from the wire 1 by means of anti-clockwise rotation of the shaft 5.

The device is small and simple in construction and may be cheaply manufactured.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. In an attachment for trolley poles normally engaging a conductor, comprising a guide mounted adjacent said conductor and extending parallel therewith; and means engaging between said conductor and said guide to resiliently press said trolley pole against said conductor.

2. In an attachment for trolley poles normally engaging a conductor, comprising a guide mounted adjacent said conductor and extending parallel therewith; and means rotatably mounted and detachably engaging between said conductor and said guide to resiliently press said trolley pole against said conductor.

3. In an attachment for trolley poles normally engaging a conductor, comprising an auxiliary non-conducting cable mounted adjacent and below said conductor and extending parallel therewith; and means rotatably mounted and detachably engaging between said conductor and said cable to resiliently press said trolley pole against said conductor.

4. In an attachment for trolley poles normally engaging a conductor, comprising an auxiliary non-conducting cable mounted adjacent and below said conductor and extending parallel therewith; brackets on said trolley pole; a shaft journalled in said brackets and having one end turned outwardly; and a pulley mounted on one end of said shaft and adapted to detachably engage said auxiliary cable and resiliently press said trolley pole against said conductor.

5. In an attachment for trolley poles comprising spaced brackets mounted thereon; a shaft journaled in said brackets and having one end turned outwardly; a spring on said shaft; a stop on said shaft; a pulley rotatably mounted on said shaft; and a cable mounted beneath said pulley and resiliently and detachably engaged thereby, to retain said trolley pole in operative position.

In testimony whereof I have signed my name to this specification in the presence of two subscribing witnesses.

JAMES F. HEALY

Witnesses:
JOSHUA R. H. POTTS,
FREDA C. APPLETON.